United States Patent
Cole et al.

(10) Patent No.: US 7,036,939 B2
(45) Date of Patent: May 2, 2006

(54) DIGITAL PROJECTOR CONTROL METHOD AND APPARATUS

(75) Inventors: James R Cole, Albany, OR (US); William J. Allen, Corvallis, OR (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

(21) Appl. No.: 10/629,065

(22) Filed: Jul. 28, 2003

(65) Prior Publication Data

US 2005/0024600 A1    Feb. 3, 2005

(51) Int. Cl.
*G03B 21/16* (2006.01)

(52) U.S. Cl. .................. 353/52; 353/57; 353/121; 349/72

(58) Field of Classification Search ............ 353/52, 353/53, 57–61, 85, 121, 122; 362/92, 263–265, 362/276, 294, 295; 349/6, 7, 72
See application file for complete search history.

(56) References Cited

U.S. PATENT DOCUMENTS

| | | | | |
|---|---|---|---|---|
| 6,345,238 | B1 * | 2/2002 | Goodwin | .................. 702/130 |
| 6,472,828 | B1 * | 10/2002 | Pruett et al. | ................. 315/225 |
| 6,597,118 | B1 * | 7/2003 | Arimoto et al. | ............. 315/115 |
| 6,626,543 | B1 * | 9/2003 | Derryberry | .................. 353/119 |
| 6,698,898 | B1 * | 3/2004 | Terami et al. | ................. 353/52 |
| 6,702,444 | B1 * | 3/2004 | Takizawa et al. | ............. 353/52 |
| 2002/0001065 | A1 | 1/2002 | Takizawa et al. | |
| 2002/0030794 | A1 * | 3/2002 | Hosoda et al. | ................. 353/57 |
| 2002/0163626 | A1 | 11/2002 | Takizawa et al. | |
| 2002/0196606 | A1 * | 12/2002 | Hirao et al. | ................. 361/695 |
| 2003/0020884 | A1 | 1/2003 | Okada et al. | |
| 2003/0216882 | A1 * | 11/2003 | Lai et al. | .................... 702/132 |

FOREIGN PATENT DOCUMENTS

| | | |
|---|---|---|
| DE | 19959055 A | 12/1999 |
| GB | 2 369 448 | 5/2002 |

* cited by examiner

*Primary Examiner*—W. B. Perkey
*Assistant Examiner*—Andrew Sever

(57) ABSTRACT

A method and apparatus to control a digital projector. After receiving a turn-on request, the temperature associated with the light source is sensed and compared to a predetermined threshold. If the temperature is below the threshold, then the digital projector's light source is turned on. Otherwise, if the temperature is not below the threshold, the digital projector's cooling device is turned on and the turning on of the light source is delayed until the temperature falls below the threshold. After receiving a turn-off request, the cooling device is turned off coincident with the light source and without regard to the light-source temperature.

30 Claims, 4 Drawing Sheets

DIGITAL PROJECTOR CONTROL METHOD AND APPARATUS

BACKGROUND

The present invention relates to the control of a digital projector's light source and cooling device.

Digital projectors, hereinafter referred to as projectors, such as portable video projectors used to display computer-generated presentations are frequently employed in business meetings and other venues. The bright images displayed by these projectors and their ready portability are key aspects of their utility. To achieve bright images, these projectors employ special high-intensity, high-temperature light sources. Due to their high operating temperatures, these light sources require forced cooling from a cooling device such as a fan internal to the projector. A typical example of such a light source is the high-pressure mercury vapor lamp, which has an internal pressure of 200 atmospheres and an operating temperature of 1000 degrees Celsius.

These light sources are also subject to operating constraints beyond those of the ordinary incandescent lamp. Specifically, when a mercury vapor lamp is turned off after it has reached operating temperature, it cannot be immediately turned back on or "struck" which refers to the striking of a plasma arc within the lamp. The arc inside the lamp causes liquid mercury to vaporize and give off intense light. Before the lamp can be restruck, it should be cooled below approximately 450 degrees Celsius, i.e. the boiling point of mercury, to where the vaporous mercury has condensed back to its liquid state. Liquid mercury is necessary for striking the arc because vaporous mercury is not an efficient conductor of electricity.

To contend with this operating constraint, projector manufactures force the cooling fan to run for a fixed time period after the projector has been turned off. This is done to cool the light source as rapidly as possible in case the operator might want to turn the projector back on.

However, in practice, once the projector is turned off, it normally remains off until it is needed again in another meeting. Indeed, turning off the projector may signal the end of a meeting, where then the participants may then have to hurry to subsequent appointments. For example, the person making the presentation may have to rush to catch a flight or maintain some other schedule.

The fact that the fan continues to run, even though the projector has been turned off often engenders confusion in the operator. People intuitively expect projectors to act as ordinary appliances in that when they are turned off, they do not continue to run. Moreover, a business person in a hurry to leave for a subsequent appointment may become frustrated not knowing if it is safe to unplug the projector's power cord while the fan is running. Unfortunately, most people caught in this situation feel compelled to wait while the projector's cooling device continues to run.

BRIEF DESCRIPTION OF THE DRAWINGS

Like reference numbers and designations in the various drawings indicate like elements.

SUMMARY OF THE INVENTION

Figure 1:
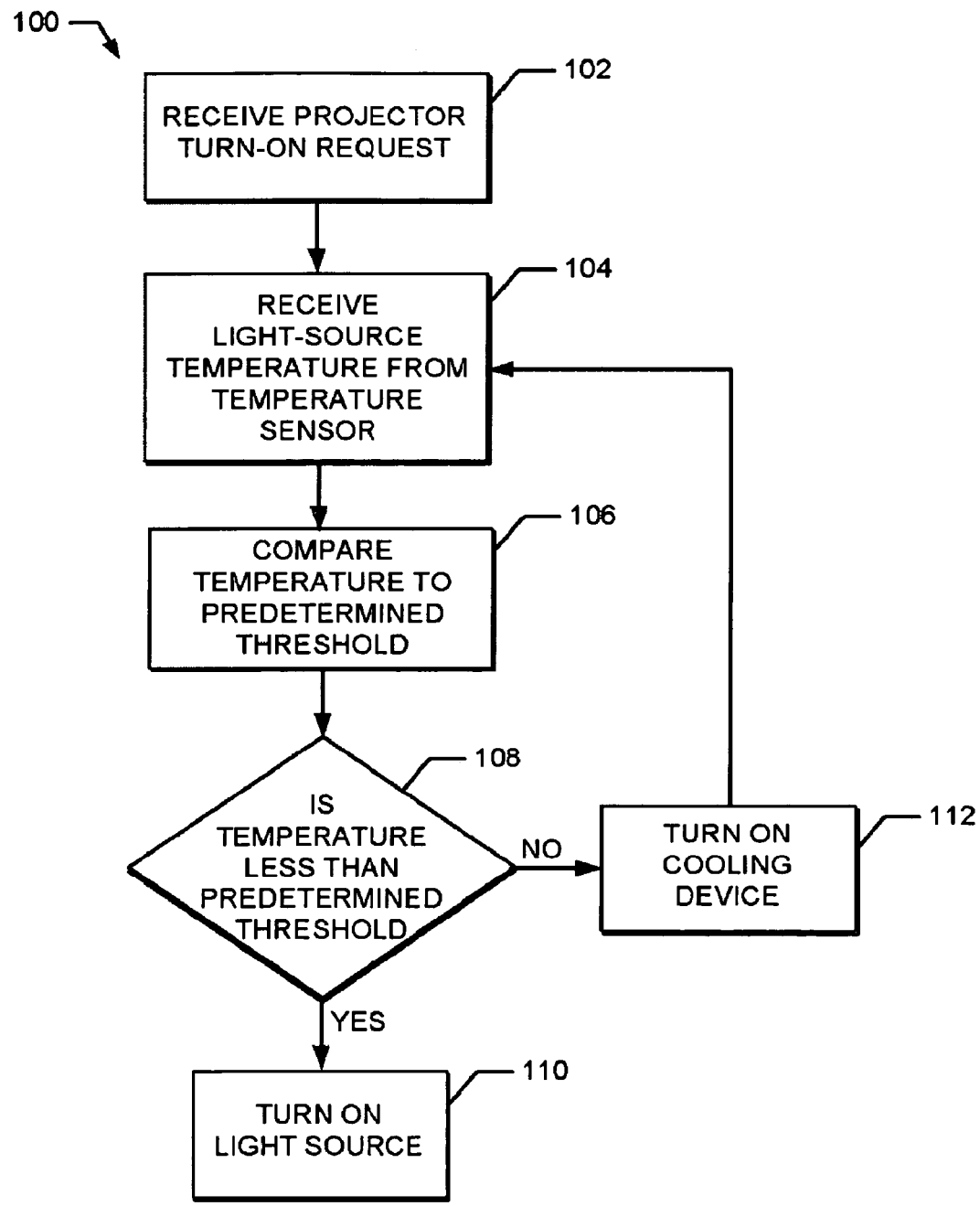
FIG. 1 is a flowchart diagram of the operations pertaining to a projector turn-on request in accordance with one implementation of the present invention.

One aspect of the present invention features a method of controlling a projector that is powered off. After receiving a turn-on request, the temperature associated with the light source is sensed and compared to a predetermined threshold. If the temperature is below the threshold, then the projector's light source is turned on. Otherwise, if the temperature is not below the threshold, the projector's cooling device is turned on and the turning on of the light source is delayed until the temperature falls below the threshold.

Another aspect of the present invention features a method of controlling a digital projector that is powered on. After receiving a turn-off request, the cooling device is turned off coincident with the light source and without regard to the light-source temperature.

DETAILED DESCRIPTION

Implementations of the present invention concern digital projectors that employ special high-intensity light sources such as xenon lamps or high-pressure mercury vapor lamps. Lamps such as the high-pressure mercury vapor lamp realize their intense brightness by employing an electric plasma arc that is first struck between two electrodes, creating a high-temperature mercury vapor environment wherein the arc can be maintained. These lamps are generally subject to more rigorous operating constraints than an ordinary incandescent lamp. Specifically, once an arc has been struck in a mercury vapor lamp and it has reached operating temperature (typically 1000 degrees Celsius), the arc cannot be restruck (as would be required in the event of a power interruption) until the lamp has been cooled below the boiling point of mercury (approximately 450 degrees Celsius), thus allowing the vaporous mercury to condense into its liquid state. To attempt to strike an arc while the lamp is too hot is deteriorative to its electrodes. Implementations of the present invention protect such projector lamps while at the same time avoiding inconvenience for the projector operator.

Aspects of the present invention are further advantageous in at least one or more of the following ways.

The present invention allows a projector's cooling device to be turned off coincident with the projector's light source. This assures the operator that the projector system is completely turned off and eliminates the confusion caused by the fan continuing to run even though the projector has been turned off. The advantage is that the operator is no longer compelled to wait while a projector's fan runs for a fixed period of time after the projector has been turned off. Thus, the operator may immediately unplug the projector to either store it away or transport it to another location.

A further advantage of the present invention is that involves sensing the temperature of the light source during system turn on to determine if it should be cooled before being turned on. Sensing the light source temperature in this manner protects the valuable projector light source from damage. For example, repeated attempts to restrike the arc in a high-pressure mercury vapor lamp before the vaporous mercury has cooled to the point of condensation will erode the lamp's electrodes and shorten the life of the lamp. Typically, this aspect of the present invention would be called into play if the projector were accidentally unplugged or turned off while in use.

FIG. 1 is a flowchart diagram of the operations pertaining to a projector turn-on request 100 in accordance with one implementation of the present invention. A remote control unit or a simple on/off switch mounted on the projector can be used to generate the turn-on request (102) that is then received by the projector's system controller.

After the projector has been turned on, the light source temperature is then received from the temperature sensor (104). In practice, the temperature can come from a sensor directly in the vicinity of the light source or it can be inferred by sensing the projector's interior operating temperature. For example, the sensor could be mounted within the light-source compartment in proximity to the lamp where the temperature could be sensed directly. Alternatively, the sensor could be mounted on a circuit board within the body of the projector.

After the light-source temperature has been received, it is compared to the predetermined threshold (106). For high-pressure mercury vapor lamps, this threshold is approximately 450 degrees Celsius. This temperature is the boiling point of mercury. So, below this temperature the vaporous mercury is once again a liquid and it safe to strike an arc between the lamp's electrodes. Attempting to strike an arc while the mercury is in a vaporous state will cause erosion of the lamps electrodes and shorten the life span of the lamp.

If the temperature is at or below the threshold (108) then the lamp can be turned on (110). Typically, if the projector is at room temperature, it will turn on without delay in response to a turn-on request. As previously mentioned, turn-on of a high-pressure mercury vapor light-source involves striking an arc between two electrodes in the presence of liquid mercury. The intense heat of the electric arc will vaporize the mercury. The combination of the vaporous mercury and the electric field between the electrodes will create a plasma, producing intense light at an operating temperature of approximately 1000 degrees Celsius.

If the temperature is not below the threshold, then the cooling device is turned on (112) to lower the temperature of the light source. Typically this circumstance will be encountered when the power is interrupted during normal use of the projector. For example, the projector's power cord could accidentally be unplugged or the projector could be unintentionally turned off. In this case the operator would desire resumption of the presentation as quickly as possible. Without this protection feature in place, the projector's lamp could be damaged by repeated attempts by the operator to turn on the lamp while it was over the proper temperature for turn-on.

Figure 2:
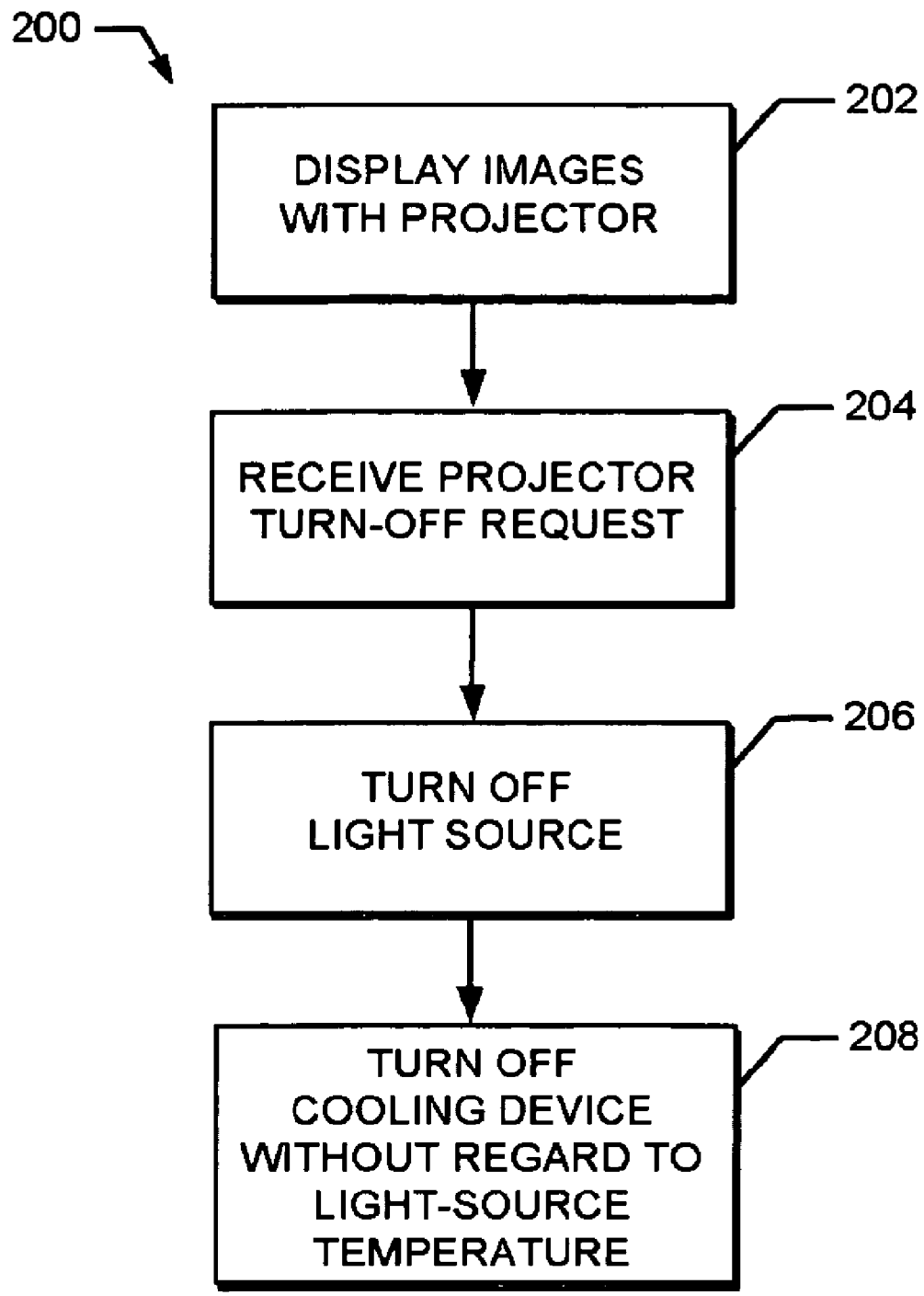
FIG. 2 is a flowchart diagram of the operations pertaining to a projector turn-off request in accordance with one implementation of the present invention.

FIG. 2 is a flowchart diagram of the operations pertaining to a projector turn-off request 200 according to one implementation of the present invention. During typical operation where the projector is on and displaying images (202), the projector's lamp will have been on long enough to reach normal operating temperature. For high-pressure mercury vapor lamps, this temperature is approximately 1000 degrees Celsius.

As described earlier, the typical use of a projector in a business meeting is to turn it on and leave it on for the duration of the meeting. In fact, turning off the projector often signals the end of the meeting, where upon the meeting participants will rush to subsequent appointments. To turn off the projector, the operator can throw a switch located on the body of the projector or request the projector to turn off via a remote control. In either case, the projector's system controller will receive a turn-off request (204). Conventional projectors at this point cause the projector's cooling fan to run for a fixed period of time. The purpose of this is to cool the lamp as quickly as possible in the event that the operator might wish to turn the projector back on. However, the typical effect is to inconvenience the operator who is generally in a hurry to leave and is now undecided if it is safe to unplug the projector while the fan is still running. Most people will incorrectly assume that the projector's lamp must receive forced cooling after use. In reality, letting the lamp cool naturally without forced cooling generally results in less stress on the lamp.

In contrast to the conventional response to a turn-off request, the action of the present invention is to turn off both the light source (206) and, within a time frame, turn off the cooling device without regard to the light-source temperature (208). For example, time frame that could be perceived as immediate, a few seconds, or a period of time convenient for the operator. This action is less confusing to the operator in that the projector now behaves as an ordinary appliance and turns off completely in direct response to the turn-off request. A further advantage is that a projector performing an unnecessary cooling operation no longer detains the operator who may be in a hurry to pack up and leave. Yet a further advantage is that passive cooling of the projector's lamp generally results in less stress on the lamp and thus prolongs the lamp's life span.

Figure 3:
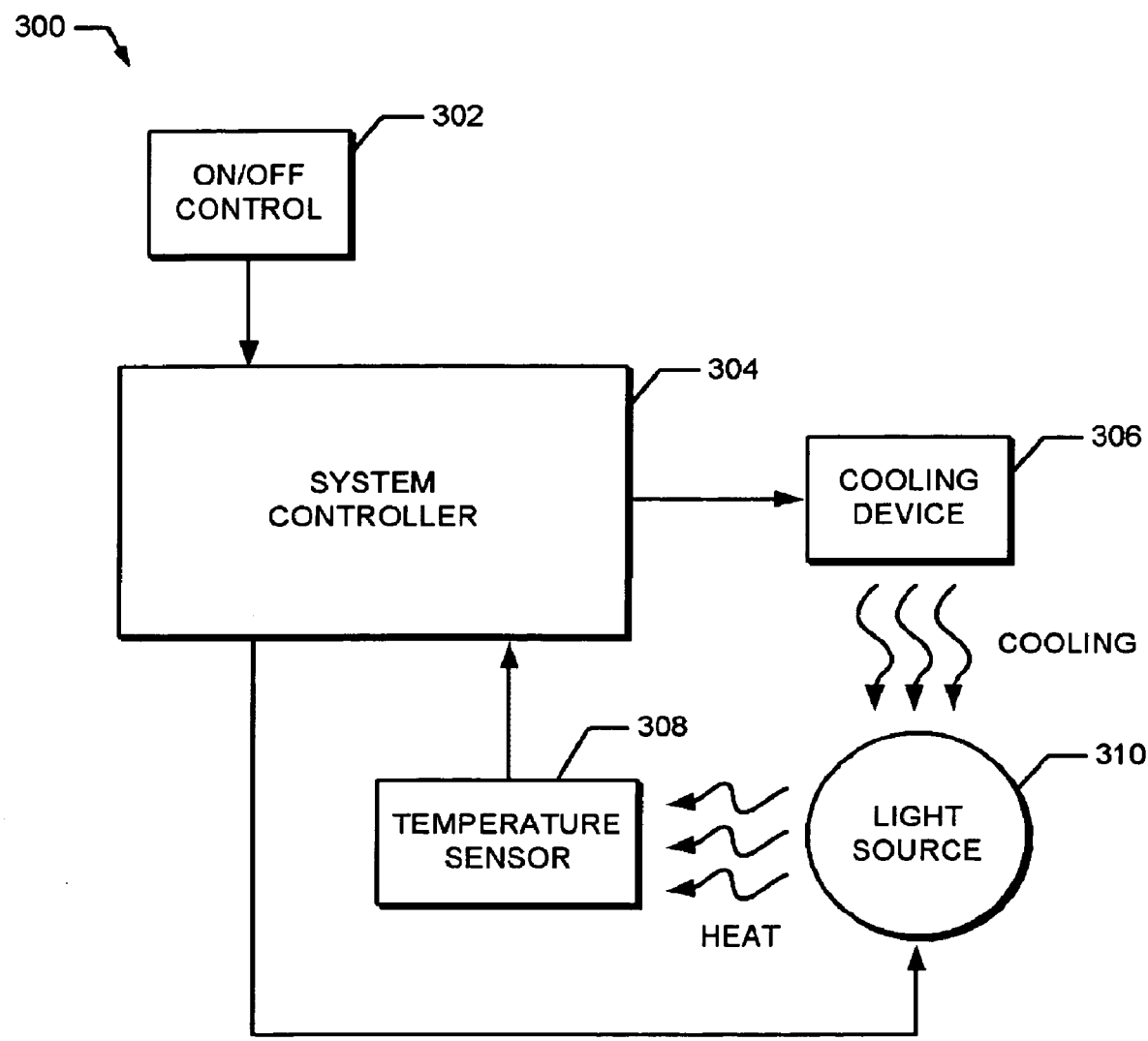
FIG. 3 is a block diagram illustrating the system organization of the projector's light source control and cooling device control according to one implementation of the present invention.

FIG. 3 is a block diagram representation of a projector system 300 designed in accordance with one implementation of the present invention. The projector system 300 includes an on/off control 302, a system controller 304, a cooling device 306, a temperature sensor 308, and a light source 310.

In a typical implementation the on/off control 302 can be a switch located on the projector or it could be implemented as part of the receiving circuit of a remote control. In either case, the on/off control 302 serves to send the turn-on request and the turn-off request to the system controller 304.

Figure 4:
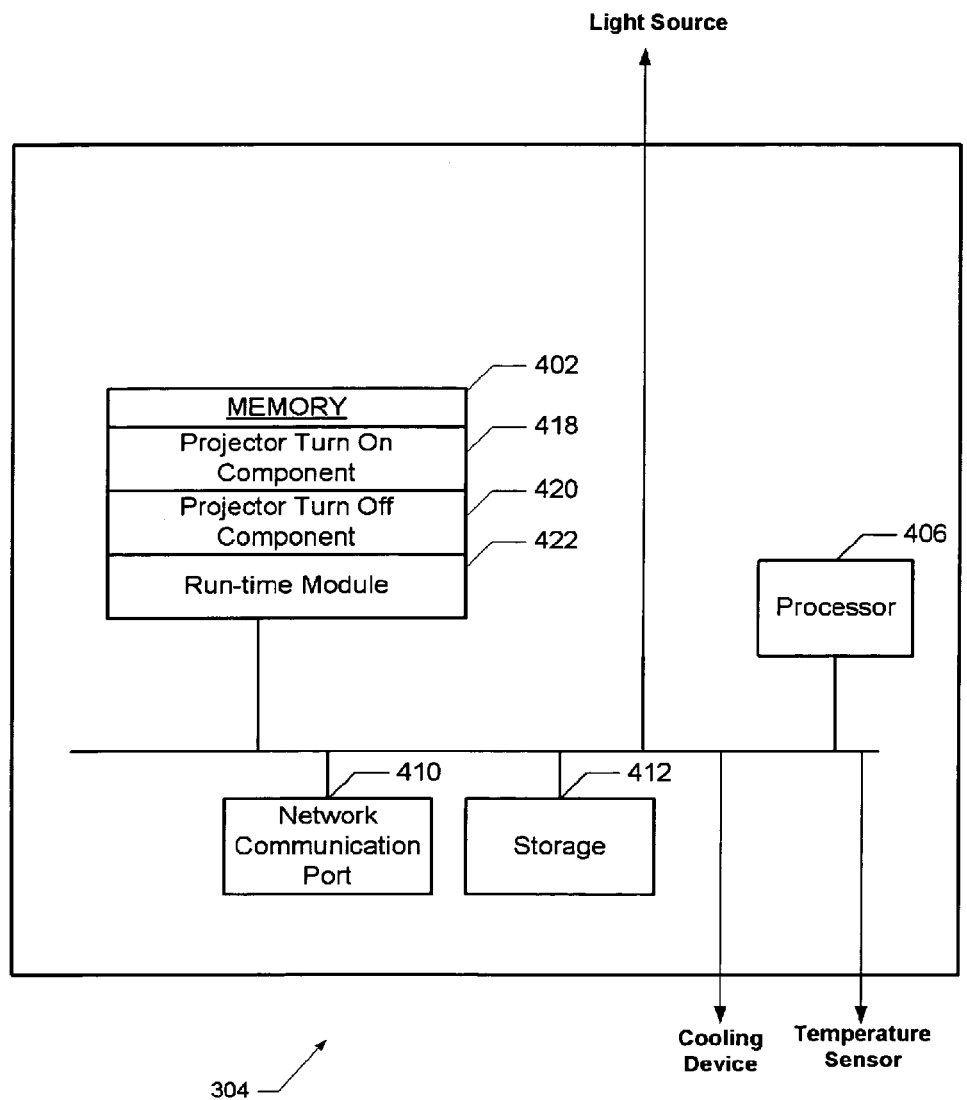
FIG. 4 is a block diagram of a projector's integrated computer system operating as system controller in accordance with one implementation of the present invention.

The system controller 304 can be variously implemented as an application-specific integrated circuit, field-programmable gate array, dedicated microcontroller, microprocessor, or even as part of a projector's integrated computer system as illustrated in FIG. 4. Example system controller 304 in FIG. 4 includes a central processing unit(406), random access memory(402), mass storage (412), and access to an external network (410). In memory 402, the projector turn on component 418 and projector turn off component 420 perform operations that turn off and turn on the light source in accordance with implementations of the present invention as described previously in conjunction with FIG. 1 and FIG. 2. Run time 422 is an operating system or other resource manager that manages one or more resources associated with system controller 304 including allocation of memory 402. In addition to the just described digital solutions, the function of the system controller 304 can also be implemented as an analog circuit employing a comparator to compare the light source temperature with the predetermined temperature. The action of the system controller 304 is to directly turn off the cooling device 306 and the light source 310 in response to a turn-off request. When a turn-on request is received, the temperature supplied by the temperature sensor 308 is compared with the predetermined threshold temperature for safe turn-on of the light source 310. If the temperature is at or below this threshold then the light source 310 is turned on. If it is below the threshold, then the cooling device 306 is turned on to quickly lower the temperature of the light source 310.

Typically, the cooling device 306 is implemented as a fan. The purpose of the cooling device is to lower the temperature of the light source 310 both in normal operation and in preparation for light-source 310 turn-on when the light source 310 is still above the safe temperature for turn-on.

The temperature sensor 308 sends the temperature of the light source 310 to the system controller 304. The temperature sensor 308 can be located in direct proximity to the light source where the light source 310 temperature can be directly measured. The temperature sensor 308 can also be located within the body of the projector, where the light-source 310 temperature can be estimated as function of the projector's internal temperature. There are various implementations for the temperature sensor 308 including a resistive sensor where the sensor's resistance varies as a function of the temperature. Another implementation of the temperature sensor 308 includes a silicon sensor where the voltage drop across a silicon PN-junction varies as a function of the temperature.

The light source 310 is typically implemented as a high-pressure mercury vapor lamp. As mentioned earlier, lamps of this type are subject to operating constraints beyond those of ordinary incandescent lamps. For example, they cannot be readily turned off and on like an incandescent lamp. This is because the lamp generates its intense light by means of a plasma arc within a vaporous mercury environment. To strike (i.e., initiate) the arc, the mercury must be it its liquid state. This is not a problem when the lamp is at room temperature because mercury boils (i.e., becomes vaporous) at approximately 450 degrees Celsius. Once the arc has been struck, the plasma will eventually reach a normal operating temperature of approximately 1000 degrees Celsius. This extreme heat necessitates forced cooling by a cooling device 306 during normal operation. Forced cooling is also required to bring the temperature of the lamp below the boiling point of mercury in order to restrike the arc in the event of a power interruption during normal operation. This is because vaporous mercury is not a good conductor of electricity and trying to strike an arc in this state is erosive to the lamp's electrodes.

While examples and implementations have been described, they should not serve to limit any aspect of the present invention. Accordingly, versions of the present invention can be implemented in digital or analog electronic circuitry, or in computer hardware, firmware, software, or in combination therein.

Further, while specific embodiments have been described herein for the purposes of illustration, various modifications may be made without departing from the spirit and scope of the invention. For example, implementations of the present invention are previously described as being used in a digital projector, however alternate implementations can be used in video projectors, overhead projectors, projection televisions, and cinema projectors. Accordingly, the invention is not limited to the above-described implementations, but instead is defined by the appended claims in light of their full scope of equivalents.

What is claimed is:

1. A method of controlling a digital projector, comprising:
   receiving a request to turn on the digital projector;
   receiving temperature data associated with a light source from a temperature sensor;
   comparing the temperature data to a predetermined threshold;
   turning on a cooling device and keeping the light source off if the temperature data is above the predetermined threshold and if a turn-on request has been received; and
   turning on the light source if the temperature data is at or below the predetermined threshold and if a turn-on request has been received.

2. The method of claim 1 wherein the digital projector is selected from a set of projectors including: an overhead projector, a video projector, a projection television, and a cinema projector.

3. The method of claim 1 wherein the light-source is selected from a set of lamps including xenon lamp and a high-pressure mercury vapor lamp.

4. The method of claim 1 wherein the predetermined threshold is substantially the boiling point of mercury.

5. The method of claim 1 wherein the turn-on request received is from an on/off control mounted on the digital projector.

6. The method of claim 1 wherein the turn-on request received from a remote control.

7. The method of claim 1 wherein the received temperature data comprises data taken in proximity to the light source.

8. The method of claim 1 wherein the received temperature data comprises data taken from the internal environment of the digital projector.

9. A method of controlling a digital projector, comprising:
   turning on a cooling device and keeping the light source off if the temperature data is above a predetermined threshold and if a turn-on request has been received;
   turning on the light source if the temperature data is at or below the predetermined threshold and if a turn-on request has been received;
   displaying images with the digital projector using a light-source;
   receiving a request to turn off the digital projector;
   turning off the light-source in response to the request received; and
   turning off a cooling device in response to the request and within a substantially immediate time frame without consideration of the light-source temperature.

10. The method of claim 9 wherein the digital projector is selected from a set of projectors including: an overhead projector, a video projector, a projection television, and a cinema projector.

11. The method of claim 9 further comprising:
    cooling the light-source passively upon receiving the turn-off request.

12. The method of claim 9 wherein the light-source is a high-pressure mercury vapor lamp.

13. The method of claim 9 wherein the turn-off request received is from an on/off control mounted on the digital projector.

14. The method of claim 9 wherein the turn-off request received from a remote control.

15. The method of claim 9 wherein the cooling device is a fan.

16. A light source control apparatus for a digital projector, comprising:
    a light source for the projection of images;
    a temperature sensor for measuring the temperature of the light source and signaling when the temperature of the light source is at or below a predetermined temperature threshold;

a cooling device that lowers the temperature of the light source until the signal from the temperature sensor indicates the temperature is at or below the predetermined temperature threshold;

an on/off control for requesting an activation of the light source and requesting the light source to be turned off; and a control mechanism that receives the request to activate the light source and turns on the cooling device and keeps the light source off when the temperature of the light source is not at or below the predetermined threshold then activates the light source when the signaling form the temperature sensor indicates the temperature is at or below the predetermined temperature threshold.

17. The apparatus of claim 16 wherein requesting to turn off the light source results in turning off the cooling device in response to the request and within a predetermined time frame without consideration of the light-source temperature.

18. The apparatus of claim 16 wherein a light source comprises a high-pressure mercury vapor lamp.

19. The apparatus of claim 16 wherein a temperature sensor comprises a resistive sensor.

20. The apparatus of claim 16 wherein a temperature sensor comprises a silicon PN-junction sensor.

21. The apparatus of claim 16 wherein a temperature sensor is mounted in proximity to the light source.

22. The apparatus of claim 16 wherein a temperature sensor is mounted within the body of the digital projector.

23. The apparatus of claim 16 wherein a cooling device comprises a fan.

24. The apparatus of claim 16 wherein a on/off control comprises a switch mounted on The digital projector.

25. The apparatus of claim 16 wherein an on/off control comprises a remote control.

26. The apparatus of claim 16 wherein the control mechanism further comprises a computer system integrated into the digital projector having a central processing unit, random access memory, mass storage, and access to an external network.

27. An apparatus for controlling a digital projector, comprising:

means for receiving a request to turn on the digital projector;

means for receiving temperature data associated with a light source from a temperature sensor;

means for comparing the temperature data to a predetermined threshold;

means for turning on a cooling device and keeping the light source off if the temperature data is above the predetermined threshold and if a turn-on request has been received; and means for turning on the light source if the temperature data is at or below the predetermined threshold and if a turn-on request has been received.

28. An apparatus for controlling a digital projector, comprising:

means for turning on a cooling device and keeping the light source off if the temperature data is above the predetermined threshold and if a turn-on request has been received;

means for turning on the light source if the temperature data is at or below the predetermined threshold and if a turn-on request has been received;

means for displaying images with the digital projector using a light-source;

means for receiving a request to turn off the digital projector;

means for turning off the light-source in response to the request received; and means for turning off a cooling device in response to the request and within a substantially immediate time frame without consideration of the light-source temperature.

29. A computer program product for controlling a digital projector, tangibly stored on a computer-readable medium, comprising instructions operable to cause a programmable processor to:

receive a request to turn on the digital projector;

receive temperature data associated with a light source from a temperature sensor;

compare the temperature data to a predetermined threshold:

turn on a cooling device and keeping the light source off if the temperature data is above the predetermined threshold and if a turn-on request has been received; and turn on the light source if the temperature data is at or below the predetermined threshold and if a turn-on request has been received.

30. A computer program product for controlling a digital projector, tangibly stored on a computer-readable medium, comprising instructions operable to cause a programmable processor to:

turn on a cooling device and keeping the light source off if the temperature data is above a predetermined threshold and if a turn-on request has been received;

turn on the light source if the temperature data is at or below the predetermined threshold and if a turn-on request has been received;

display images with the digital projector using a light-source;

receive a request to turn off the digital projector;

turn off the light-source in response to the request received; and turn off a cooling device in response to the request and within a substantially immediate time frame without consideration of the light-source temperature.

* * * * *

UNITED STATES PATENT AND TRADEMARK OFFICE
CERTIFICATE OF CORRECTION

| | | |
|---|---|---|
| PATENT NO. | : 7,036,939 B2 | Page 1 of 1 |
| APPLICATION NO. | : 10/629065 | |
| DATED | : May 2, 2006 | |
| INVENTOR(S) | : Cole et al. | |

It is certified that error appears in the above-identified patent and that said Letters Patent is hereby corrected as shown below:

In the Claims

Col. 8 (line 28), delete "old:" and insert therefor --old;--.

Signed and Sealed this

Twenty-third Day of January, 2007

JON W. DUDAS
*Director of the United States Patent and Trademark Office*